G. KOHLMEYER, C. E. WING, AND H. SCHELHAMMER.
MACHINE FOR MAKING COMBS.
APPLICATION FILED APR. 16, 1921.
1,425,595.
Patented Aug. 15, 1922.
2 SHEETS—SHEET 1.
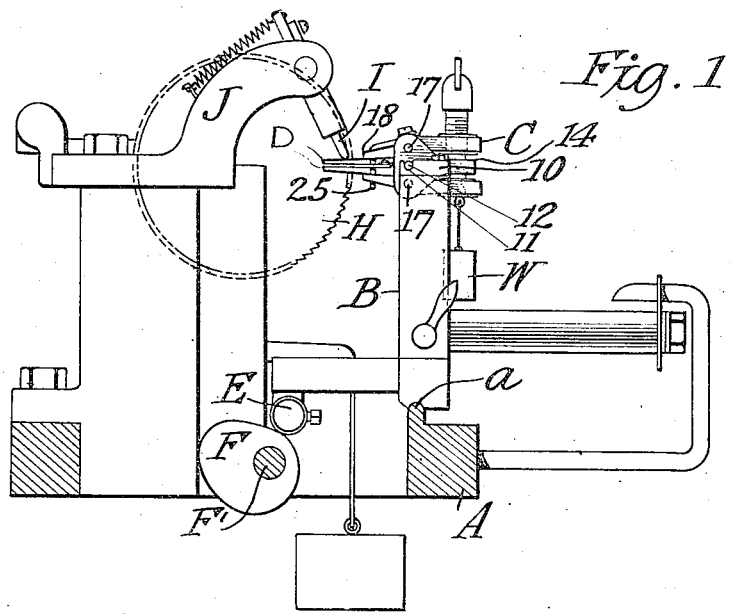
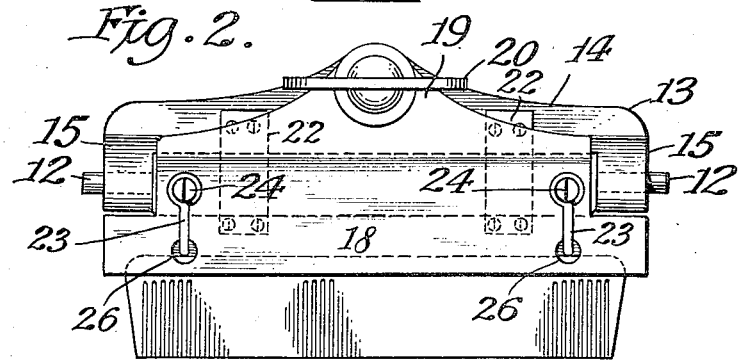
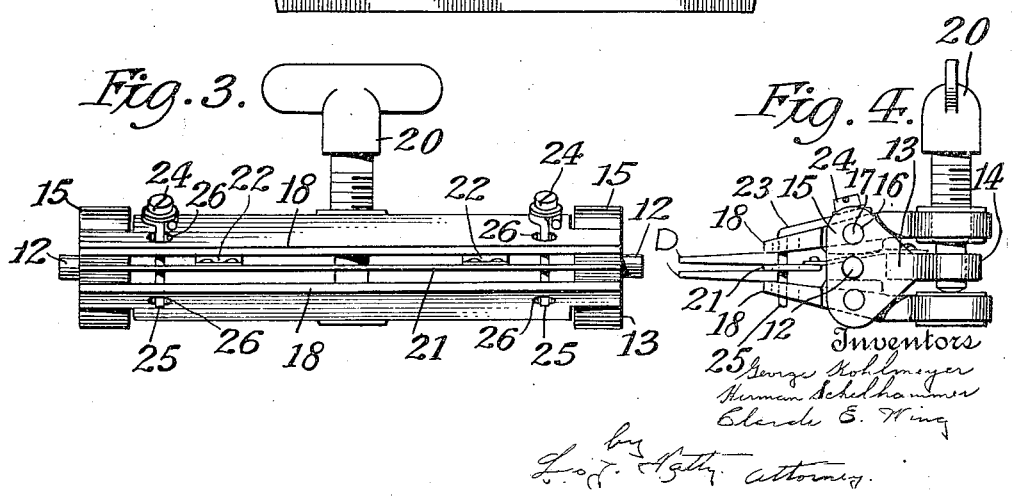
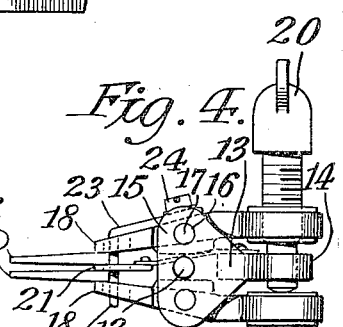

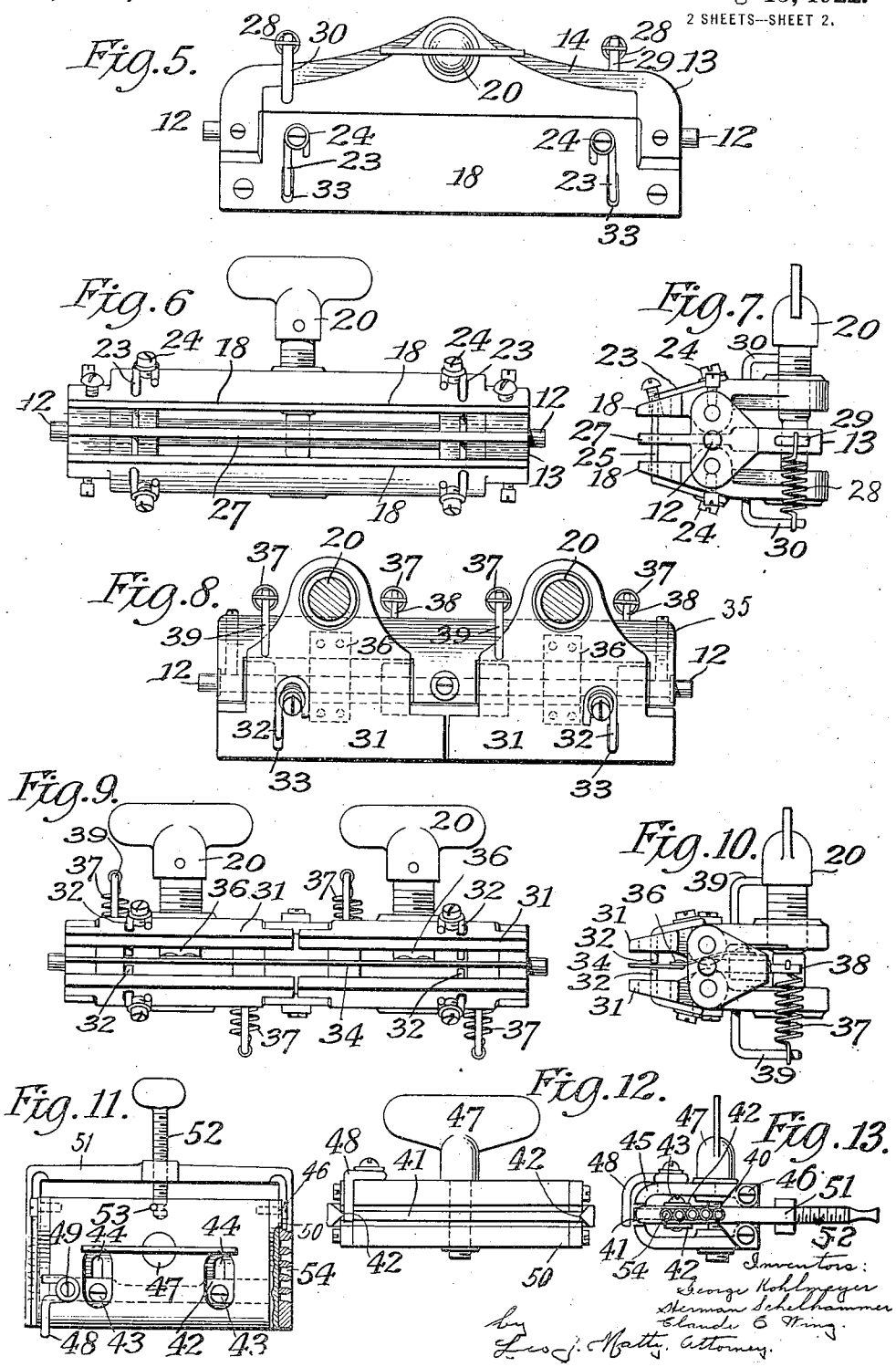

UNITED STATES PATENT OFFICE.

GEORGE KOHLMEYER AND CLAUDE E. WING, OF COLLEGE POINT, AND HERMAN SCHELHAMMER, OF WHITESTONE LANDING, NEW YORK, ASSIGNORS TO AMERICAN HARD RUBBER CO., OF NEW YORK, N. Y., A CORPORATION OF NEW YORK.

MACHINE FOR MAKING COMBS.

1,425,595.    Specification of Letters Patent.    Patented Aug. 15, 1922.

Application filed April 16, 1921. Serial No. 462,060.

*To all whom it may concern:*

Be it known that we, GEORGE KOHLMEYER and CLAUDE E. WING, both residing at College Point, in the county of Queens and State of New York, and HERMAN SCHELHAMMER, residing at Whitestone Landing, in the county of Queens and State of New York, all citizens of the United States, have jointly invented new and useful Improvements in Machines for Making Combs, of which the following is a description, such as will enable others skilled in the art to which it appertains to make and use the same.

This invention relates to improvements in clamps for holding comb blanks in the operation of cutting or sawing away the web portions between the teeth, and it is particularly adapted for use in connection with the machine shown and described in the patent granted to Frederick W. Grell, machine for manufacturing combs, July 6, 1897, No. 585,818.

A principal object of this invention is to provide a double or duplex clamp for holding two comb blanks in perfect registration so that the web portions between the teeth of both blanks may be cut away simultaneously, thus greatly reducing cost of production.

A further object of this invention is to produce a double comb blank clamp of simple strong construction, easy to attach and detach from the machine and comparatively inexpensive.

In the accompanying drawings there is illustrated different practical embodiments of the invention, but the constructions shown therein are to be understood as illustrative only, and not as defining the limits of the invention.

Referring to the drawings:

Figure 1 is a general view of a machine for making combs, and showing our improved double comb clamp secured in normal operative position.

Figure 2 is an enlarged plan view of the clamp.

Figure 3 is a front view; and

Figure 4 is a side view thereof.

Figure 5 is a plan view showing a modified construction.

Figure 6 is a front view; and

Figure 7 is a side view thereof.

Figure 8 is a plan view showing a further modified construction.

Figure 9 is a front view; and

Figure 10 is a side view thereof.

Figure 11 is a plan view showing a still further modified construction.

Figure 12 is a front view; and

Figure 13 is a side view thereof.

For the purpose of this description, it will only be necessary to describe the machine shown in Figure 1 in a general way; and we will proceed as follows:

In the drawings A designates the base of the machine. B the carriage or support slidable on a track $a$ formed lengthwise of the machine. On the upper part of this carriage is supported our improved clamp C adapted to hold a pair of comb blanks D.

Journaled in bearings on the under side of the carriage B is a screw E engaging a threaded cam F fixed to a shaft F' and this cam, in the operation of the machine, imparts to the carriage an intermittent step movement, as described in the above identified patent.

The saw or cutter is shown at H; and carried on a bracket J is a guide finger I engaging the successive web portions between the teeth of the uppermost comb blank as the clamp is fed across the cutter, and to maintain the uppermost blank against the finger I we provide a weight W suspended from the clamp.

Blocks 10 are mounted at the top of carriage B at opposite sides of the clamp C and are notched at 11 to receive trunnions 12 projecting from the ends of the clamp C.

The clamp as shown in Figures 2, 3 and 4 comprises a yoke shaped frame 13 constituted by a bar 14 having end heads or members 15 which are bored centrally to receive the trunnion pins 12. The heads 15 are further provided with perforations 16 to receive the trunnions 17, of a pair of jaw members 18 having backward extensions 19 the extension of the upper jaw being orificed and threaded to receive a winged clamping-screw 20 which extends through an opening in the bar 14 and bears against the extension 19 of the lower jaw, as clearly shown in Figure 4.

Positioned between the gripping part of the jaws is a clamp plate 21 arranged to lie between the comb blanks when clamped in position, said clamp plate being yieldingly held in position by leaf spring arms 22. By this construction combs of different thickness can be clamped in position, that is, a thick one can be clamped with a thin one for cutting.

Gauge wires 23 are anchored on screws 24 and have angled extensions 25 which range downwardly through openings 26 in the jaws 18 and clamp plate 21 and which serve as stops for the backs of the comb blanks to rest against, to determine the depth of the cut in the blanks.

In the form of construction shown in Figures 5 to 7, inclusive, the frame 13 is formed with an integral clamp plate or tongue 27 held in yielding relation with the clamp jaws 18 by springs 28 pulling in opposite directions, the springs being secured at one end to pins 29 on the frame 13, and at the other end to arms 30 secured to the upper and lower jaws.

In the form of construction shown in Figures 8, 9 and 10 inclusive, we have shown a double comb blank with four jaws 31 and four gauge fingers 32 extending inwardly through slots 33 nearly to a clamp plate 34 yieldingly carried on the frame 35 by leaf spring arms 36 and held centrally of the jaws 31 by opposed springs 37 secured to the frame through pins 38 and to arms 39 on the opposite jaws 31.

Referring to Figures 11, 12 and 13 of the drawings, we have shown a double clamp for holding fine tooth combs which comprises a frame 40 having a forwardly directed clamp plate 41 on which adjustable gauge plates 42 are secured by screws 43 passing through slots 44.

Clamp jaws 45 are hinged at 46 to the ends of the frame and are clamped down on the comb blanks by a winged screw 47 which passes loosely through the clamp plate 41. An end gauge 48 is capable of adjustment on a screw 49 tapped in the upper jaw 45.

The clamp plate 41 has guide grooves 50 formed in the ends to receive, in sliding relation, the parallel arms of a yoke frame 51 adjustably carried on a screw 52 swiveled in the frame 40 and held against longitudinal movement by a cross pin 53.

The arms of the yoke frame 51 are formed each with a series of preferably tapered openings 54 adapted to receive pins (not shown) provided on the carriage of the comb making machine to hold the clamp in operative position.

It is thought that the operation and utility of the device will be apparent without further description, and while in the drawings there is illustrated different practical embodiments of the invention, it is to be understood that the structural elements thereof are susceptible to such variations and modifications as fall within the scope of the appended claims.

What we claim and desire to secure by Letters Patent, is:

1. A comb clamp comprising a frame, a pair of jaws, a clamp plate positioned between and spaced from the jaws, and a screw carried by one of said jaws and adapted to engage the other of said jaws.

2. A comb clamp comprising a frame having trunnions at the ends thereof for swingably supporting said clamp, jaws in said frame, a clamp plate between the jaws and a screw to operate said jaws carried by one of said jaws and adapted to engage the other of said jaws.

3. A comb clamp comprising a frame having end trunnions, jaws pivoted therein, a clamp plate yieldingly supported between the jaws, and a screw to operate the clamp as described.

4. A comb clamp comprising a frame having trunnions at the ends, jaws pivoted in said frame, gauge wires ranging across the jaws, a clamp plate between the jaws and a screw to operate the clamp as described.

5. A comb clamp comprising a frame, having means for supporting the clamp in a machine, a pair of jaws pivoted in said frame, adjustable gauge wires ranging across and through the jaws, a clamp plate positioned between the jaws and screw means for operating the clamp as described.

6. In a comb clamp, a frame adapted to be pivotally mounted in a machine, a pair of jaws pivoted to said frame, means between said jaws adapted to co-operate with said jaws for holding a pair of comb blanks therebetween, means for aligning said blanks, and means for partly rotating said jaws for causing said jaws to grip said blanks.

7. In a comb clamp, a frame having supporting trunnions, jaws pivoted in said frame, a clamp plate, means for holding the clamp plate in central yielding position between the jaws, and a screw for operating the clamp, as described.

8. In a comb clamp, a frame, jaws pivoted therein, a yielding clamp plate between the jaws, adjustable gauge devices and a screw for operating the clamps as described.

9. A comb clamp adapted to hold a pair of comb blanks in alignment for allowing simultaneous operation on said blanks by one cutter, a swingable frame having means at the ends to attach said frame to a machine, a pair of jaws pivoted to said frame, means between said jaws for spacing said blanks, adjustable gauge wires for positioning said blanks and a screw arranged to turn said jaws about their pivots for causing said jaws to grip said blanks.

10. In a comb clamp, a frame adapted to be pivotally mounted in a machine, gripping jaws pivoted to said frame, a yieldable clamping plate interposed between said jaws, and means for partly rotating said jaws to cause a pair of blanks to be gripped in spaced relation in said clamp.

11. A comb clamp adapted to hold a pair of comb blanks in alignment and in spaced relation to each other comprising a pair of swingable jaws, a yieldable clamp plate positioned between said jaws and means for swinging said jaws whereby each of said jaws may be brought into clamping engagement with a comb blank.

12. A comb clamp adapted to hold a pair of blanks in spaced relation comprising a pair of swingable jaws, a yieldable clamp plate positioned between said jaws, means for aligning said blanks, and a screw carried by one of said jaws and adapted to engage the other of said jaws for swinging said jaws into clamping engagement with said blanks.

In testimony whereof we have signed this specification in the presence of two subscribing witnesses.

GEORGE KOHLMEYER.
CLAUDE E. WING.
HERMAN SCHELHAMMER.

Witnesses:
GEORGE C. STRACHAN.
FRED J. STELLER.